Figure 1:
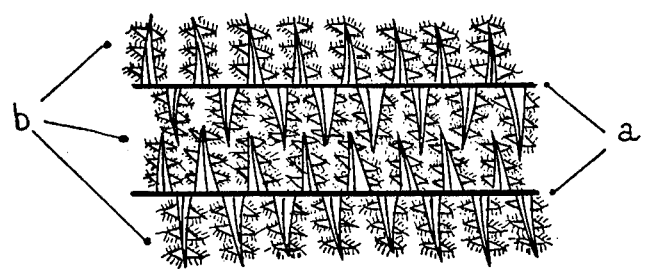

United States Patent [19]

Brossel et al.

[11] 4,076,885
[45] Feb. 28, 1978

[54] WATER PROOFING AGENT

[75] Inventors: Maurice Brossel, Rueil-Malmaison; Gilbert Laurent; Daniel Bertannier, both of Neuf-Brisach, all of France

[73] Assignees: Holzstoff. S.A., Basel, Switzerland; Viafrance S.A., Paris; Societe Nationale Elf Aquitaine (Production) - SNEA(P), Courbevoie, both of France

[21] Appl. No.: 623,003

[22] Filed: Oct. 16, 1975

[30] Foreign Application Priority Data

Oct. 16, 1974 Switzerland .................. 13874/74

[51] Int. Cl.² ............................................. B32B 27/00
[52] U.S. Cl. .................................. 428/286; 427/422; 427/443; 428/291; 428/489
[58] Field of Search ............... 427/422, 443; 106/274, 106/275, 287 SC; 428/286, 288, 291, 302, 489, 297

[56] References Cited

U.S. PATENT DOCUMENTS

| 3,632,418 | 1/1972 | Draper | 428/291 |
| 3,721,578 | 3/1973 | Bennett et al. | 428/291 |
| 3,810,857 | 5/1974 | Garrigues | 106/274 |
| 3,864,157 | 2/1975 | Bressin et al. | 428/291 |
| 3,869,417 | 3/1975 | Romsay | 428/291 |

Primary Examiner—James J. Bell
Attorney, Agent, or Firm—Wenderoth, Lind & Ponack

[57] ABSTRACT

A high quality water proofing material of easier applicability than those employed previously comprises a non woven fabric of isostatic polypropylene fibres treated with a mixture of bitumen and sulphur.

9 Claims, 3 Drawing Figures

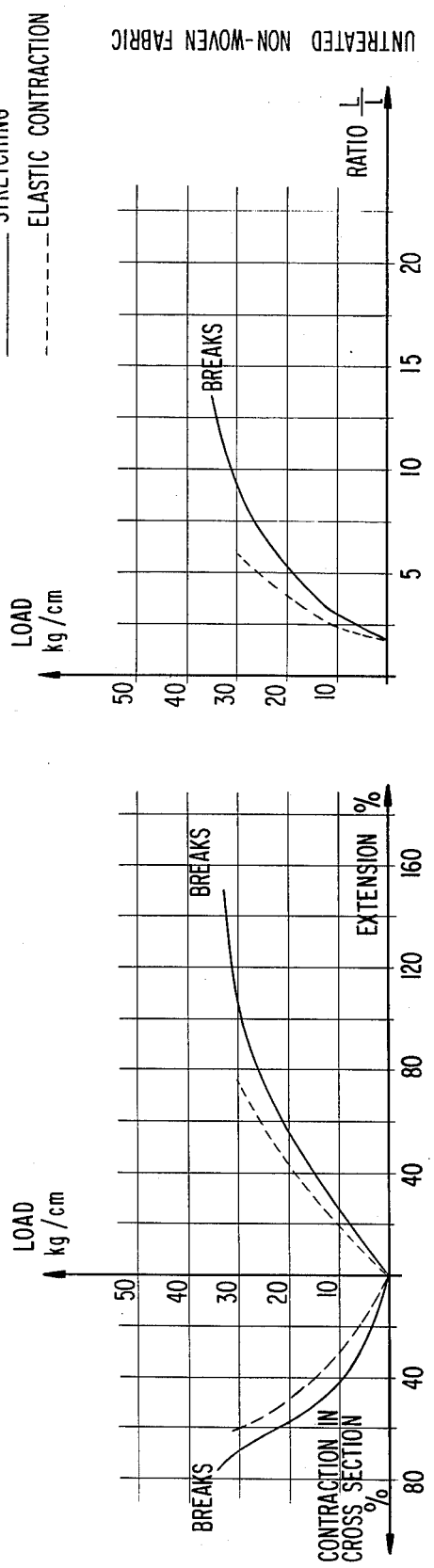
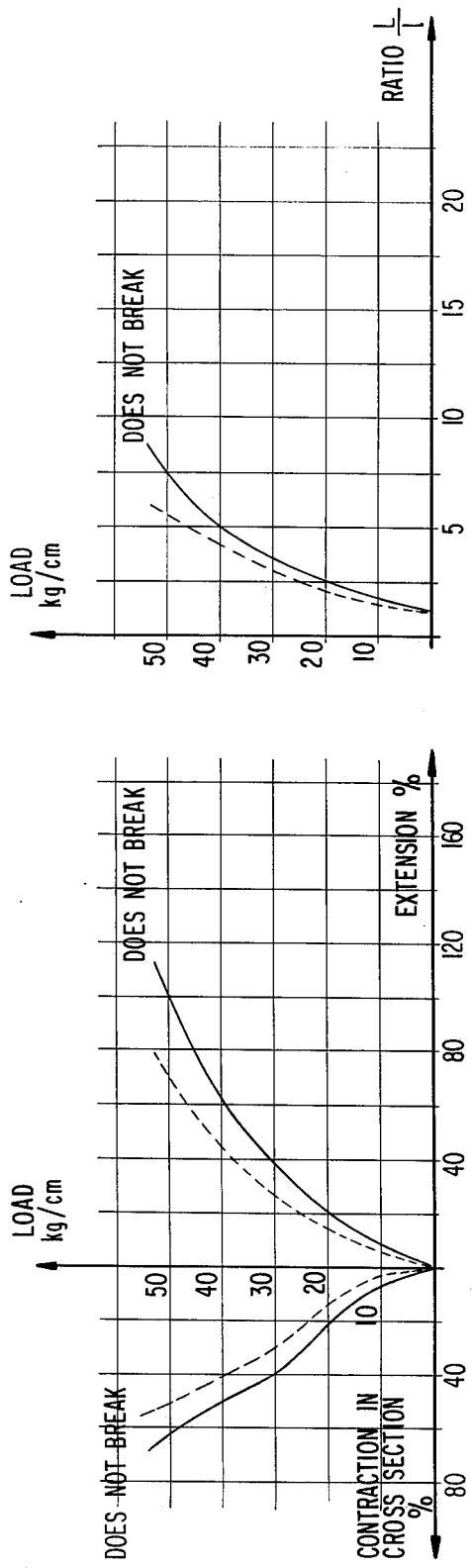
FIG. 2 (TESTS IN THE DIRECTION ACROSS THE FIBRES)

FIG. 3  (TESTS IN THE DIRECTION ACROSS THE FIBERS)
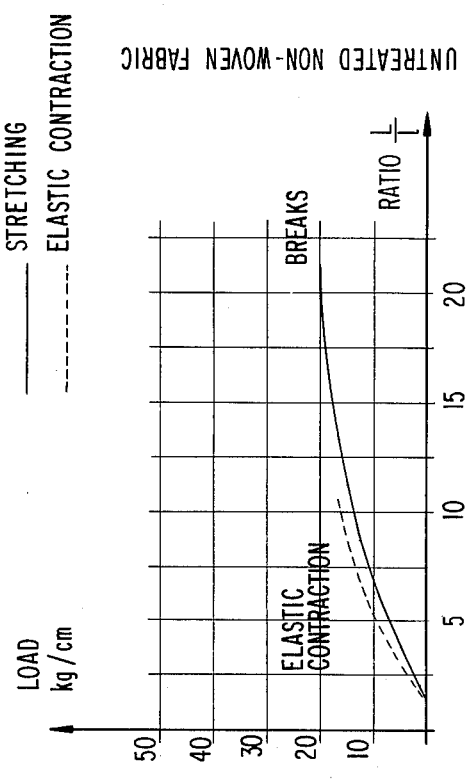
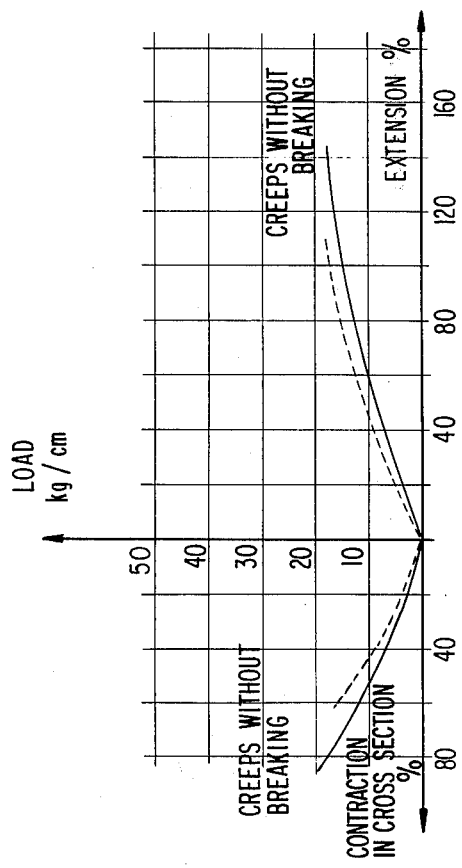
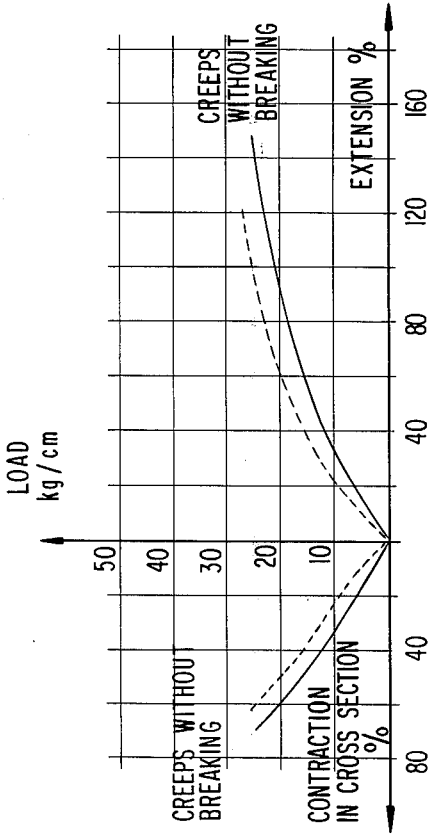

WATER PROOFING AGENT

The present invention relates to a new water proofing agent, capable of providing a complete proofing to water and having a high degree of resistance to organic solvents, used in civil engineering and building projects. It also has for an object the preparation of the said water proofing agent.

The water proofing agent according to the invention corresponds perfectly to that which is required for civil engineering and building projects, and is distinguished from products existing today by the fact that it combines a complete water proofness with the properties of good holding under traction, and flection, to tearing, to bursting, and to stamping.

It is already known to employ a combination of a non woven fabric and an aqueous emulsion of running bitumen. This does not always ensure complete water proofing because of breaking of the emulsion and the elimination of water freed by such breaking. Furthermore, it is known that the association of a non-woven fabric and a hot bituminous current only ensures total waterproofing with the use of a very high proportion of bitumen. In fact, when bitumen is employed in such a proportion, the role of the fabric practically disappears and one can no longer consider that it acts in association with the bitumen. At lower proportions of bitumen, while there is effectively an association between the bitumen and fabric, one observes neither complete waterproofing (for the reason of physiochemical incompatability of a product consisting of fibres and the bitumen employed) nor any satisfactory holding of the association at elevated operating temperatures; in effect at these temperatures the viscosity of the bitumen decreases which causes a flowing of the bitumen on the fabric, especially in applications in positions other than horizontal, and a corresponding disappearance of homogeneity in the combination. Furthermore, use of certain special bitumens, notably oxidized bitumens or smooth flowing bitumens, does not permit direct treatment of the fabric on the construction site and necessitates fabrication in a workshop.

On the other hand, use of the products today available on the market requires, at the moment of assembly, different components, the adoption of special arrangements and in particular either use of glue or high usage of energy to ensure self adhesion by pressure. Furthermore, as mentioned previously they do not provide simultaneously the combination of the mechanical properties required and total water imperviousness.

But the applicants have now found, and thereby achieved the object of the present invention, a water-proofing agent having all of the properties previously referred to, characterized in that it can consist of a combination of a non woven fabric, or an assembly of non woven fabrics, of continuous isostatic polypropylene filaments and a glue consisting of a mixture of sulphur and bitumen, which bitumen has a fluidity between 120° and 160° C thus permitting at the said temperatures the dispersion of sulphur in the bitumen, the weight ratio of sulphur to bitumen being preferably between 15 to 85 and 30 to 70.

The weight ratio of the fabric, or the assembly of fabrics, to the glue is in general within the range between 1 to 0.5 and 1 to 60, preferably around 1 to 10.

The non woven fabric is of a type made by direct spinning based on continuous filaments of isostatic polypropylene.

Preferably one employs a polypropylene having a fluidity index at 230° C of 0.5 to 30; this index is determined by the weight of the material at 230° C which flows in 10 minutes across a draw plate 2.095 mm in diameter and 8 mm long under a pressure of 2.16 kilograms. The elaboration of these non woven fabrics consists in outline of extruding a polymer of the type described with the aid of a slubber. The extrudate is then forced across a series of draw plates of predetermined profile. The filaments are stretched across appropriate pipes supplied with compressed air.

The fabric so obtained may be directly subjected to tufting. They may also be calendered, then submitted to tufting or to a bias passage on a folding machine and tufting. Before this one should take care to oil the fabric in order to reduce their co-efficient of fibre/fibre friction and fibre/metal friction and to improve their dynamometric properties. The final fabrics are able to be processed or latexed or shrunk or calandered in order to modify their texture (flow) and to improve their dynamometric properties. Fabrics particularly suitable for the preparation of a waterproofing agent according to the invention have a weight of 10 to 100 grams per square meter.

One may add to the polypropylene charges of additives in order to confer certain specific advantageous properties in accordance with the anticipated application. In this way the non woven structure may be modified in a manner conforming with the envisaged application by the choice of draw plates, each one of them having for example a number of holes, between 32 and 108 the diameter of the holes corresponding to that for the filament at the time of being drawn to grists between 0.5 and 30 dtex.

One may finally proceed to the assembly of fabrics, by direct tufting or by biased holding and tufting of two fabrics of different grist in order to have a structure having a density gradient.

The glue is based on modified or non modified bitumen, but which is sufficiently fluid between 120° and 160° C to permit dispersion of sulphur at these temperatures. The proportion of sulphur to bitumen is defined as a function of the specified properties of the waterproofing agent and of the impregnability of the fabric, and preferably lies between 15 to 85 and 30 to 70. The glue may be modified by the addition of solvents, fluxant, charging substances, pigments or mineral or organic coloring agents, herbicidal or fungicidal compounds, etc.

The process of producing and storing the glue to be employed is chosen in such a fashion as to confer upon the glue particular properties adapted for the envisaged use. It has been shown, in effect, that the temperature and the duration of the heating of the glue considerably influences its properties (softening point, penetrability, ductility, etc).

In the case of preparation at a temperature below 160° C the preparation may be effected either in a continuous system or in a discontinuous system.

When the technique of fabrication in a continuous system is adopted the process of fabrication and the materials employed are those shown in Example 1. When a discontinuous system is adopted the glue, prior to heating to the fabrication temperature, is introduced into a turbojet pump and mixed in close circuit. The other components are added progressively until the desired composition is obtained and the mixture is mixed in close circuit at a reaction temperature until homogeneous mixture is obtained. In the case of production at a temperature above 160° C the process is identical with that described for the production below 160° C. Further, the material used requires a device permitting use of low pressure for surrounding the fabrication and neutralisation of the gaseous effluent. The stocking of the produced material is carried out preferably under an atmosphere of non reactive gas.

The glues thus prepared may be applied either to the non woven fabric in the dried state or to damp fabric previously treated by an adhesive agent specific to the fibres constituting the fabric. This adhesive agent has the effect of holding water to the polypropylene fibres in such a manner as to prevent contact with the bitumen; it consists preferably either of an acetate of a secondary amine or a suspension of a quaternary amine in a phenolated coal oil, both in aqueous suspension of 1 to 10, atomized onto the fabric at around 40 grams per square meter. As an example of the adhesive agent of the acetate of a secondary amine type, one may refer to the product "Dinoram" (Societe Pierrefitte-Auby, France), as an example of quaternary amine type the product Polyram S (quaternary amine of the alkyd propylene polyamide type; same manufacturer), both in the form of a suspension as mentioned above.

The application of the glue to the non woven material may be effected either by atomization or by soaking. Atomization is carried out at a temperature in the region of 140° C and at a pressure between 4 and 6 bars through special nozzles of a helix. These nozzels are mounted on a distribution ramp of constant separation chosen in such a fashion as to ensure good transverse distribution. This ramp is of the double walled heating ramp type. The deposit is obtained either by constant pressure of a neutral gas or by a dosing pump or by a system of pump and discharge valves. The ramp is placed at 40 cm above the fabric to be treated. When the application is by soaking, it is effected at a temperature of 140° plus or minus 5° C. The mode of application is described in detail in Example 2.

The bitumen sulphur glue previously described is distinguished by the following specific properties:
  Lowering of the temperature of application due to the fluidifying powers of the sulphur;
  Affinity vis a vis the polypropylene fabric assuring an improvement in the mechanical properties, an insensitivity to water and avoidance of formation of beads;
  Progressive reticulation of the glue under the effect of partial crystallization of the sulphur (see FIG. 1 reducing therefore the sensitivity of the glue to an increase in temperature and as a consequence avoiding migration of the glue both to the heart of the fabric and on the surface, thereby conserving for the time its properties of flexibility and endurance.

Microscopic study carried out on the crystallization in the bitumen sulphur milieu has revealed to us a veritable entanglement among the fibres of the non woven polypropylene and the crystallites as shown by FIG. 1 wherein
  a is polypropylene fibers
  b is entangled crystallizations.

Furthermore, the addition of sulphur to the bitumen in the indicated proprotions permits control of the penetration of the bitumen into the non woven material in adapting itself to the structure of the non woven material and its base material in such a fashion as to confer a total watertightness equally on porous deformable supports as well as on non deformable porous supports, this being due to the fibre-glue adhesion caused by the presence of sulphur in the glue.

The lowering of viscosity at the given temperature permits impregnation of non woven material at a temperature sufficiently low to be able to be adapted for this purpose. On the other part, it becomes equally possible to subject the glue to high pressure (4 to 6 bars) without modification of the product, which permits atomization at high pressure on the non woven material. The waterproofing agent may moreover be prepared at the site of its employment because the phenomena of migration of the glue on the fabric are greatly diminished at the start of the application and completely suppressed after a few hours by the mechanism of crystallization of the sulphur which is intimately entangled in the non woven material. This entangling confers on the waterproofing agent a homogeneous structure and a high degree of cohesion which finds itself reinforced by the particular affinity of the bitumen sulphur glue vis a vis the polypropylene filaments.

These properties may be shown in the following fashion:

A series of isostatic polypropylene filaments having a thickness of 15 dtex and possessing a resistance of 2.78 grams per dtex for an extension of 257% are submitted to the following treatments:
  A. hot air at 140° C for 30 mins;
  B. treatment in bitumen at 140° C for 30 minutes followed by washing with hexane;
  C. treatment with the bitumen sulphur glue at a temperature of 140° C for 30 minutes followed by washing with hexane.

After treatment the properties of the filaments were found to be modified as follows:

TABLE I

| Treatment | Resistance to breaking in g/dtex NF G07008 | extension % NF G07008 |
| --- | --- | --- |
| Sample | 2.78 | 257 |
| A. hot air | 2.72 | 228 |
| B. bitumen | 2.50 | 197 |
| C. bitumen/sulphur glue | 2.88 | 221 |

It appears therefore, contrary to the treatment with bitumen alone which seems to attack the polypropylene filaments, that treatment with the bitumen sulphur glue improves its properties.

In summary, the following advantages result from the present invention:
  Utilization of glue at lower temperature due to the fluxing effect of the sulphur;
  Preparation of the waterproofing agent in situ rendered possible by the stability of the glue which enables atomization at high pressure;
  High cohesion in the association of the non woven material with the glue due to the crystallisation of the sulphur;
  The particular affinity of the bitumen sulphur glue on filaments of polypropylene.

These advantages confer on the proofing agent according to the invention an adaptability to deformation of the supports on which it is deposited, notably to shearing, to stamping, to flection and to bursting, together with a complete waterproofing. The sensitivity to water is supressed and that to solvents, in particular to hydrocarbons, is greatly reduced.

On the other part, and this is a very important point, the proofing agent is self sticking when cold on application to it of pressure, and the bonding is total when the temperature applied becomes higher than the softening point of the glue. This property permits avoiding utilization of paste or application of heat for bonding.

The proofing agent according to the invention permits one to realise the principal proofing, the proofing of channelling or of semi permeable membranes for use in civil engineering and building whether buried or not, and on the other part to provide an effect of heating of supports of certain parts of the work. It makes possible in particular the formation of supports adapted to different structures employed in civil engineering and in building assuring the water-proofing and the bonding of different beds forming the structures and contributing to the mechanical work of the corresponding sections, moreover to production of support beds or bonding, notably for coatings whether preformed or not for dubbings.

EXAMPLE 1

In a monofilament extruder is placed polypropylene around 270° C. The fluidity index of the polymers $i^2$ 230 is 15 (corresponding to the weight of matter at 230° C which flows in 10 minutes across the draw plate of 2.095 mm in diameter and 8 mm length under a pressure of 2.16 kilograms.). The fused mass is then pushed across a system of filters of which the meshes cause good homogenization of the mass. With the aid of gear pumps the polymer is then led through draw plates.

Upstream of these are placed sieves which have the role of filtering and homogenizing the molten mass. The draw plates have either 32 or 108 holes arranged in various zones. The dimensions of the outgoing holes of the draw plate are chosen in such a fashion to avoid phenomena such as breakage of the melt. The total capacity of the assemblage of draw plates is between 300 and 450 kilograms per hour.

The filaments cooled by a system of conditional air are led by drawing channels where they are drawn at 20 kilograms per square centimeter; the filaments are then guided by tubes up to the formation table. These tubes stop by a system of separators of which the profile is chosen in such a fashion to cause good dispersion of the filaments on the table. The cover of the formation table provides a void of meshes which may vary according to the thickness of the filaments extruded.

One forms respectively two fabrics; one in filaments of 2 dtex with draw plates of 108 holes and the other in filaments of 15 dtex with draw plates of 32 holes.

| Quality of Filaments | first fabric | second fabric |
|---|---|---|
| $1^2$ 190 | 10 | 12 |
| grist in dtex | 15 | 2 |
| strength in g/dtex | 3.2 | 3.8 |
| extension in % | 100 | 175 |

The fabric of 15 dtex weighing about 30 grams per square meter is calendered at a temperature of 115° C and at 20 kilograms per centimeter hydraulic pressure on the screw jack. The fabric of the type of 2 dtex weighing 20 grams per square meter is calandered at a temperature of 130° C and at 25 kilograms per centimeter hydraulic pressure on the screwjack.

The two fabrics comprising respectively filaments of 2 and 15 dtex are then oiled and then assembled by folding six times and tufted to a density of around 120 impacts per square centimeter, to result in fashioning of a final product of about 320 grams per square meter.

The glue is constituted by a mixture comprising by weight (1) 70% of bitumen to penetration 80/100, normal NFT 6604 modified in the mass by containing 0.15% in the form of Polyram S which has the effect of reinforcing the quality of the product, and (2) 30% of powdered sulphur.

The properties of this glue measured likewise after application are as follows:
Density measured on the Hubbard picnometer comprising between 1.16 and 1.17 (normal NFT 6607).
Penetrability lies between 82 and 95 (normal NFT 6604)
The Billeand Anneau softening point lies between 44° and 47° C (normal NFT 6608) Shock cohesion measured by the Vialit penduleum method:
At 23° C lies between 1.3 and 1.5 kilograms meter/cm$^2$
At 5° lies between 1.2 and 1.9 kilogram meters/cm$^2$
At 18° C lies between 1.2 and 3.0 kgm/cm$^2$
At 55° lies between 2.7 and 4.8 kgm/cm$^2$

| Dynamic viscosity at | 110° C | 500 | centipoises |
|---|---|---|---|
| " | 120° C | 350 | " |
| " | 130° C | 232 | " |
| " | 140° C | 150 | " |
| " | 150° C | 130 | " |
| " | 160° C | 100 | " |
| " | 170° C | 80 | " |

After an attempt at accelerated aging in an oxidizing hot room for 72 hours at 55° C following the Vialit procedure the properties of the glue were as follows:
Loss of weight lies between 0.1 and 0.6%
The Bille and Anneau softening point lies between 50° and 55° C Cohesive shock at −23° C lies between 0.9 and 1.2 kg m/cm$^2$
5° C lies between 1.0 and 1.5 kg m/cm$^2$
18° C lies between 1.5 and 2.5 kg m/cm$^2$
55° C lies between 3.0 and 5.0 kg m/cm$^2$ The preparation of the glue is effected in two steps.
In the first operation the bitumen is raised to a temperature lying between 130° and 140° C and is mixed by stirring by means of a pump working in a closed circuit.
In the second operation the powdered sulphur is melted and raised to a temperature in the region of 135° C.
It is then introduced at the same time as the bitumen Polygram S mixture into a cone-shaped turbine having regular gaps and heaters. These gaps are regulated as an opening lying between 35 and 50 hundreths of a mm which corresponds in this example to the content of the material utilized to deposit 10 tons per hour. The turbine together with the laminate is operated continuously by simultaneous feeding by dosage pumps in order to avoid entrainement of air into the mixture. The glue thus formed is stored under an atmosphere of nitrogen in vats.

The bitumen sulphur glue thus formed is atomized for use as described herebelow at a temperature in the region of 140° C onto the non woven material maintained at room temperature. This disposal comprises:

1. A heated, insulated storage vat disposed in a mashing system;
2. A system applying pressure to the glue by the intermediary of a neutral gas. It is also possible to use a system of pressure by a pump working for a constant deposit.
3. An atomization ramp having a double heating envelope having at regular intervals a series of atomizing nozzles arranged as a helix capable of functioning between 4 and 6 bars.

The distance of the ramp above from the fabric to be impregnated is 40 cm ± 3 cm. The assemblage of the vat and ramp is fixed. The non woven material is passed at constant speed calculated as a function of the deposit of the ramp in order to obtain the desired weight of glue (3 kilogram per square meter of non woven material in the present example). In the case of application on site the non woven material is first unrolled on the work piece. The vap ramp assemblage is mobile and empties itself at a constant speed calculated in such a manner as to obtain the desired dosage. On the work force the atomisation of the glue is effected in principal on the only upward face. In the work shop the atomization may be effected on one or two faces simultaneously or otherwise.

If before application of the glue the non woven fabric is damp it is previously treated by atomization at a weight of 40 g/m² of a suspension of Polyram S in an oil of phenolated coal diluted at 1 to 10 parts of water.

The mechanical properties of the material thus treated are set out in Table II which also show moreover the mechanical properties of the non treated material of the same weight. The load deformation curves correspond to charging and discharging cycles represented by the graphs of FIG. 2.

EXAMPLE 2

In a monofilament type extruder one melts polypropylene at around 270° C. The fluidity index of the polymer $i^2$ 230 is 15. The fused mass is then pushed across a system of filters in which the meshes are set to bring about good homogenisation of the extrudate. With the aid of gear pumps the polymer is then dosed and bled upon the draw plate.

Upstream of these are placed sieves which have the role of filtering and homogenising the molten mass. The draw plates have either 32 or 108 holes arranged in various zones. The dimensions of the outgoing holes of the draw plate are chosen in such a fashion to avoid phenomena such as breakage of the melt. The total capacity of the assemblage of draw plates is between 300 and 450 kilograms per hour.

The filaments cooled by a system of conditional air are led by drawing channels where they are drawn at 20 kilograms per square centimeter; the filaments are then guided by tubes up to the formation table. These tubes stop by a system of separators of which the profile is chosen in such a fashion as to cause good dispersion of the filaments on the table. The cover of the formation table provides a void of meshes which may vary according to the thickness of the filaments extruded.

TABLE II:

| | CHARACTERISTICS | | Simple non woven fabric | Non woven fabric impregnated at weight of 3 kg/m² with bitumen:sulphur ratio 70/30 –80/100 |
|---|---|---|---|---|
| Tests of water-proofness under water pressure at 20° C | ON A NON DEFORMABLE POROUS SUPPORT | PRESSURE 2 atoms | not effective | waterproof |
| | | PRESSURE 4 atoms | not effective | waterproof |
| | ON A DEFORMABLE POROUS SUPPORT | PRESSURE 2 atoms | not effective | waterproof |
| | | PRESSURE 4 atoms | not effective | waterproof |
| | EXTRUSION AND PURITY UNDER WATER PRESSURE | on complete tissue | not effective | 12 atmospheres |
| | | on seams | | 9 atmospheres |
| Tests of static piercing | Punch A Section φ20 2.58 cm² φ29 | | pierced at 968 kg/cm² | Pierced at 498 kg/cm² |
| | Punch B section φ 29.5 2.26 cm² φ 34.5 | | pierced at 670 kg/cm² | Pierced at 446 kg/cm² |
| | Punch C 2.54 cm² φ19 | | pierced at 2362 kg/cm² | Pierced at 600 Kgs/cm² |
| Stretching deformation at rate of 1mm in direction across fibers | load at breakage | | 12 kg/cm | 21 kg/cm |
| | extension at breakage | | 100% | 107% |
| | constriction at breakage | | 84% | 68% |
| | 1:1 ratio at breakage | | 5.8% | 26% |
| COMMENCEMENT OF BREAKING AT 1mm/s at 20° C | | | 7.9 kg per mm of thickness | 5.4 kg per mm of thickness |

A - Extension
S - Constriction
$\frac{L}{l}$ - Ratio of width

| | | Stretching | | | Elastic Return | | | Stretch | | | Elastic Return | | |
|---|---|---|---|---|---|---|---|---|---|---|---|---|---|
| | | %A | %S | $\frac{L}{l}$ | %A | %S | $\frac{L}{l}$ | %A | %S | $\frac{L}{l}$ | %A | %S | $\frac{L}{l}$ |
| RESISTANCE TO STRETCHING WITH CYCLE OF LOAD AND UNLOAD WITH MEASURE OF ELASTICS RETURNING STRETCHING IN DIRECTION ACROSS THE FIBERS. | Load 0 kg | 0 | 0 | 1.5 | 0 | 0 | 1.5 | 0 | 0 | 1.3 | 0 | 0 | 1.3 |
| | Load 12.6 kg per centimeter | 75.6 | 70.5 | 8.9 | 57.1 | 60.7 | 6.0 | 34.4 | 35.0 | 2.7 | 23.1 | 29.1 | 2.3 |
| | Load 16.3 kg per centimeter | 133.9 | 78.0 | 16.3 | 105.9 | 71.4 | 10.6 | 56.2 | 49.7 | 4.1 | 38.7 | 41.6 | 3.1 |
| | Load 20.1 kg per centimeter | 161.9 | 81.2 | 20.0 | breaks | | | 96.8 | 60.8 | 6.7 | 71.2 | 54.1 | 4.9 |
| | Load 23.6 kg per centimeter | | | | | | | 145.6 | 67.5 | 10.0 | 113.7 | 62.5 | 7.6 |
| | Load 27.4 kg per centimeter | | | | | | | | | | Slipping without breaking | | |
| | Load 30.1 kg per centimeter | | | | | | | | | | | | |
| | Load 32.7 kg per centimeter | | | | | | | | | | | | |
| | Load 34.9 kg per centimeter | | | | | | | | | | | | |
| | Load 35.5 kg per centimeter | | | | | | | | | | | | |
| | Load 38.6 kg per centimeter | | | | | | | | | | | | |
| | Load 42.2 kg per centimeter | | | | | | | | | | | | |
| | Load 45.9 kg per centimeter | | | | | | | | | | | | |
| | Load 49.6 kg per centimeter | | | | | | | | | | | | |

TABLE II:-continued

| CHARACTERISTICS | Simple non woven fabric | Non woven fabric impregnated at weight of 3 kg/m² with bitumen:sulphur ratio 70/30 –80/100 |
|---|---|---|
| Load 53.1 kg per centimeter | | |

The qualities of the filaments were as follows:
i² 190: 10
thickness in dtex 15
strength in grams/dtex 3.2
extension in % 200

Further, the fabric possesses a good selection of specific properties.

And for a final double width, one calanders a material of the type of relatively low weight around 60 g/m², on a calander at a temperature of 115° at 20 k/m² hydraulic pressure on the jack.

The fabric comprises filaments of 15 dtex and is fed to a folder and a tufter where it is oiled before being folded 10 times and tufted at a density of around 150 impacts per cm² in such a fashion as to produce a final product of around 600 g/m².

The glue is identical with that described in Example 1 and is made under the same conditions. However, the impregnation of the non woven nap fabric is effected by soaking. The hot sulphur bitumen glue is stored at a temperature of 140° C in an open vat of controlled heating. This vat is provided with a mashing system and an assembly of spreader rollers at point submerged in the liquid.

Before impregnation the non woven fabric is rolled on a portable roller of controllable tension and then passed across the glue by passing between the loaded rollers. It is then passed across the rolling rollers at a constant speed of unrolling after passage through a cold ventilated zone. Simultaneously there is unrolled a sheet of special non adhesive paper. The loading of the glue is regulated by the speed of the motion as a function of the porosity of the fabric.

The mechanical properties of the fabric thus treated are set out in table 3 wherein there is also given mechanical properties of a non treated fabric of the same weight. The methods of operation relating to the text are mentioned in the annex. The load deformation curves correspond to cycles of charging and discharging which are represented in FIG. 3.

The controls mentioned in the description of the invention and in the preceding examples are edited by l'Association francaise de normalisation (AFNOR) Tour Europe, 92 Courbevoic (France).

We claim:

1. In a waterproofing agent comprising a combination of a non-woven fabric and a bituminous material the improvement which resides in employing as the non woven fabric material, material obtained from continuous filaments of isostatic polyproplyene and as the bituminous material a mixture of elemental sulphur and bitumen of sufficient fluidity at a temperature in the range 120° to 160° C to permit dispersion of sulphur therein.

2. A waterproofing agent as claimed in claim 1 wherein the weight ratio of sulphur to bitumen is in the range 15.85 to 30:70.

3. A waterproofing agent as claimed in claim 1 wherein the weight ratio of non-woven fabric to bituminous material is in the range 1:0.5 to 1:60.

4. A waterproofing agent as claimed in claim 3, wherein the weight ratio of non woven fabric to bituminuous material is about 1:10.

5. A waterproofing agent as claimed in claim 1 wherein there is a plurality of layers of non woven fabric.

6. A waterproofing agent as claimed in claim 1 wherein the non-woven fabric has a weight lying between 10 and 1,000 g/m².

7. A waterproofing agent as claimed in claim 1 wherein the filaments of polypropylene have a thickness 0.5 to 30 dtex.

8. A waterproofing agent as claimed in claim 1 wherein the fabric is also treated with an adhesive agent selected from the group consisting of an acetate of a secondary amine or a suspension of a quaternary amine in phenolated coal oil.

9. A waterproofing agent as claimed in claim 1 which also comprises an additive selected from the group comprising colorants, pigments, herbicidal compounds and fungicides.

* * * * *